July 10, 1928.
L. A. M. PHELAN
1,676,922
ELECTRICAL APPARATUS
Original Filed July 19. 1923
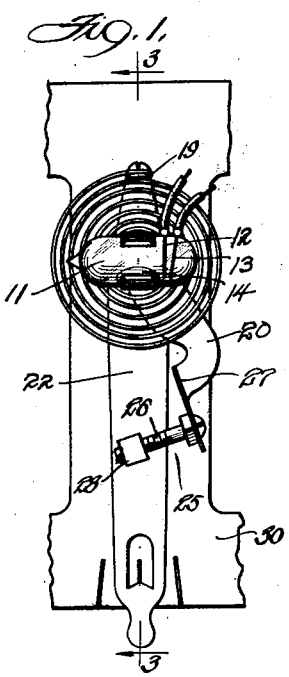
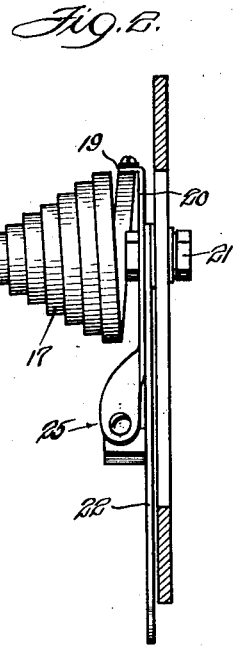
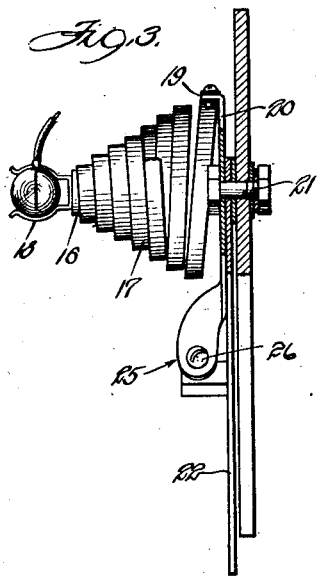
Witness:
W. K. Olson
Inventor:
LOUIS A. M. PHELAN
By Jones, Addington, Ames & Seibold
Attys.

Patented July 10, 1928.

1,676,922

UNITED STATES PATENT OFFICE.

LOUIS A. M. PHELAN, OF ELKHART, INDIANA, ASSIGNOR, BY MESNE ASSIGNMENTS, TO ABSOLUTE CON-TAC-TOR CORPORATION, A CORPORATION OF INDIANA.

ELECTRICAL APPARATUS.

Continuation of application Serial No. 652,539, filed July 19, 1923. This application filed October 7, 1925, Serial No. 60,940. Renewed January 12, 1928.

My invention relates to electrical switches and it has special reference to electrical contact making devices comprising spaced electrodes that are sealed into a closed container and are adapted to be brought into electrical conducting relation with one another through the agency of a movable conducting body, preferably a fluid, such a mercury, likewise disposed in said container, and which, on being tilted, is instrumental in performing the circuit closing and circuit opening functions of the device.

More particularly, my invention refers to tiltably operated electrical switches of the character above indicated, which will be effective to make and break an electrical circuit as a result of very slight changes in inclination thereto.

My present invention pertains to an electrical contactor device, as described above, which, if so desired, may comprise a cylindrical elongated tube, preferably in the form of a glass container, that serves to house electrodes and a body of conducting fluid; such as mercury, the latter being adapted to bridge the electrodes in the tube. The tube is preferably disposed, when installed, to occupy normally a position neighboring on the horizontal and is suitably supported so that it may be tilted in either direction and thus allow the conducting fluid to flow into and out of circuit making position at the expense of very little energy. The electrodes are sealed within the tube, and as shown in this particular instance, are adjacent to each other to form a cooperating pair.

The present disclosure illustrates the tube as mounted at the free end of a spiral thermostatic coil which is arranged to rotate the tube to change its angular position, and, by doing so, to open and close the circuit. Usually an adjustment is provided which permits the thermostatic coil to actuate the switch at a predetermined temperature. Such an adjustment may be obtained by changing the angular position of the tube.

In my copending application, Serial Number 652,539, filed July 19, 1923, of which this application is a continuation, one end of the thermostatic element is attached to an adjustable support, and the contactor switch is mounted upon the other end of the thermostatic element, additional adjusting means being provided for calibrating the device so that operation of the same, at a certain temperature, may be accurately predetermined.

An object of my invention, therefore, is to provide an improved structure, such as that illustrated and shown in my aforesaid copending application, having means for accurately calibrating the device so that the contactor will be in the proper angular position for closing or opening the circuit at a predetermined temperature.

My invention more specifically provides an electrical device having a thermostatic coil provided with a liquid contactor tube and a support for the coil which normally may be adjusted, through a regulating arm to vary the position of the liquid contactor tube, relative to the horizontal, so that the energy expended by the coil at a predetermined temperature will be sufficient to open or close the circuit at the liquid contactor tube. A proper calibrating scale relative to the regulating arm may be provided to permit the latter to be set for any desired temperature at which the contactor tube is to operate for opening and closing the circuit. It will be apparent, therefore, that an adjustable connection between the regulating arm and the support whereby the relative positions of the coil and the tube may be quickly calibrated with respect to the regulating arm, will be advantageous and will afford means for accurately and rapidly adjusting the device for operation at any desired temperature.

In order to apprise those skilled in the art how to construct and practice my invention, I describe a preferred embodiment thereof in connection with the accompanying drawings which form a part hereof.

In the drawings:

Figure 1 is a front elevational view of an electrical switch embodying the features of my invention as applied to a thermostatic bi-metallic actuating means.

Fig. 2 is a side elevational view of a device illustrated in Fig. 1; and

Fig. 3 is a vertical sectional view taken on line 3—3 of Fig. 1.

Referring to the drawings, the contactor or switching device may preferably comprise in a general way a cylindrical and elongated tube 11 made preferably of glass and housing a pair of cooperating electrodes or contact members 12 and 13 as shown located at one end of the tube, and which are spaced from each other and are adapted to be bridged by a body of conducting fluid such as mercury 14, which is likewise housed within the tube 11. The tube 11, when constructed, may be preferably first evacuated and then filled with an inert gas such as hydrogen, which is inert under the action of an electric arc in the presence of mercury and other materials which I place within the tube. It may be mentioned that the gas is provided at substantially atmospheric pressure and serves to minimize arcing or evaporation of mercury in the tube as well as deterioration of the tube and contacts. It will be observed from the drawings that if the tube 11 should be tilted in the proper direction, the body of mercury 14 will flow toward the electrodes 12 and 13, thus bridging the electrodes and placing them in electrical contacting relation with each other. The description of this tube is more fully given in my copending application and the purpose of the description thereof in the present instance is to enable one skilled in the art to understand the principles of operation of a mercury contactor switch in connection with the present invention.

The tube 11 is mounted on the outer turn 16 of the spiral form element 17 by means of detachable clips 18 suitably secured to the spiral turn 16 and clipped about the tube 11 midway between its ends.

The spiral element 17 is preferably constructed of bimetallic ribbon composed of layers of any suitable metals or alloys, such as brass or nickel, and is wound substantially in the shape of a conical or helical spiral as shown. This form of winding has a particular advantage over the more usual simple spiral forms in that a much larger portion of the surface is of the thermostatic ribbon or heat responsive element and is directly exposed to the atmosphere and air currents. This is an important consideration when this type of device is used for accurate and rapid temperature regulation.

The opposite end of the spiral element 17 is connected by means of a suitable connection 19 to one end of a support comprising an arm 20 pivoted between its ends on a mounting pin 21 as shown in Fig. 3. A regulating arm 22 is also pivotally carried by mounting pin 21 and is adapted for interconnection with the arm 20 whereby movement of the regulating arm will normally move the arm 20 to rotate the spiral element 17 about its axis. Rotation of this spiral element 17 changes the angular position of the tube 11 so that the energy required to further rotate it to circuit closing position may be varied, this being in accordance with the desired temperature at which the device should operate to close the circuit. In order words, if it is desired to have the device close the circuit at a temperature of say 70° instead of 60° the regulating arm 22 is adjusted so that the angular position of the contactor tube is changed whereby the energy the coil expends at 70° will be sufficient to continue the rotation of the tube 11 to circuit closing position.

Heretofore, it has been common practice to secure the inner end of the spiral element 17 to the end of the regulating arm, but I have found that it is difficult to properly adjust the relative positions of the coil and tube with respect to this regulating arm during the initial assembling and further that it is difficult to maintain this adjustment. For this reason the devices of the prior art have been somewhat inaccurate in their functioning. According to the disclosure herein an adjustable connection designated broadly as 25 is provided between the regulating arm 22 and the supporting arm 20. This adjustable connection 25 may be of any suitable type, but as a convenient form I have illustrated an adjustable screw 26 carried by a projection 27 on support arm 20, which screw 26 is adapted to thread into and out of an internal threaded lug 28 carried on regulating arm 22. By rotating the screw 25 and holding the regulating arm 22 in a fixed position the arm 20 will rotate about the mounting pin 21 and accordingly rotate the spiral element 17 and change the angular position of the tube 11. It will be apparent, therefore, that if the device requires adjustment so that the energy expended by the spiral element 17 when a predetermined temperature is reached will be sufficient to change the angular position of the tube 11 to move the body of mercury into contact with the electrodes 12 and 13 to close the circuit, the regulating arm will be moved to a corresponding marking at the base of the mounting plate 30 and the support arm 20 will be adjusted with respect to the regulating arm. This adjustment or correction would be made in a temperature corresponding to the desired temperature so that the exact position of the arm 20 with respect to the arm 22 will be reached when the spiral element 17 rotates to a point where the angular position of the tube closes the circuit. I have shown the structure disclosed herein in my copending application and consider the present application a continuation thereof in so far as the disclosure of the mounting is concerned. Various modifications of the means which I provide for calibrating the coil 17 may be varied according to the construction employed to regulate the device. In the present instance, I find that supporting the inner end of the spiral element 17 on a pivotally mounted arm and adjustably attaching this arm to a regulating arm which is also pivotally mounted is a simple and inexpensive construction and further is an efficient means for accomplishing this calibration.

The terms "liquid contactor tube" and "mercury contactor switch" as employed in the claims herein refer to a mercury electric contactor of a well known type of construction which comprises an hermetically sealed container in which spaced electrodes are disposed and which houses a movable body of conducting liquid, such as mercury. The electric circuit is made and broken between the said electrodes by means of the movable body of mercury. A liquid contactor tube or a mercury contactor switch of the character defined in the claims may be such a device as is described in U. S. Patents Nos. 1,598,874 and 1,598,875.

While I have shown and described a convenient embodiment of my invention, I do not intend to be limited to the details thereof as various modifications and arrangements may be had without departing from the spirit and scope of the invention.

I claim:

1. A thermostatic switch comprising a spiral thermostatic coil, a liquid contactor tube mounted at one end of said coil, a regulating arm for adjusting the angular position of said tube thereby permitting said coil to operate said tube at predetermined temperatures, and a support at the opposite end of said coil and attached to said regulating arm, said support having relative adjustment with respect to said regulating arm.

2. A thermostatic switch comprising a coiled thermostatic element, a liquid contactor tube carried at one end of said element, a pivoting arm at the axis of said coiled element for adjusting the angular position of said contactor, and a pivoting support for said element also at said axis adapted for attachment to said arm.

3. An electrical device comprising a coiled thermostatic element having one end fixed to a support, an electrical switch mounted on the opposite free end of said element, and means for rotating said support to adjust the angular position of said switch, said means and said support having adjustment relative to each other.

4. An electrical device comprising a coiled thermostatic element, a support to which one end thereof is attached, a mercury contactor switch mounted at the opposite free end of said element, and means relatively adjustable with respect to said support for adjusting the angular position of said switch.

5. A thermostatic switch comprising a thermostatic coil, a liquid contactor tube mounted at one end of said coil, a pivotally mounted regulating arm for adjusting the angular position of said tube thereby permitting said coil to operate said tube at predetermined temperatures, and a pivotally mounted support at the opposite end of said coil adapted to be attached to said regulating arm, said regulating arm and support having common pivot points and relative adjustment with respect to each other.

6. A thermostatic switch comprising a coiled thermostatic element, a switch mounted at one end of said element and adapted to open and close an electric circuit when rotated by said element, a regulating arm adapted to rotate said element and said switch whereby to adjust the angular position of said switch for operation at predetermined temperatures, a support for the opposite end of said element, and an adjustable connection between said regulating arm and said support, said adjustable connection serving as calibrating means for adjusting the relative position of the element and switch with respect to the regulating arm.

7. A thermostatic switch comprising a coiled thermostatic element, a switch mounted at one end of said element adapted to open and close an electric circuit when rotated by said element, a mounting at the axis of said element, a regulating arm carried by said mounting, a support for the opposite end of said element also carried by said mounting, and an adjustable connection between said arm and said support.

8. An electrical device comprising a coiled thermostatic element, a mercury contactor switch mounted at one end of said element, an arm pivotally mounted at the axis of said element, a support for the other end of said element also mounted at the axis of said element, and means for interconnecting said arm and said support to adjust the angular position of said switch by rotating said element about its axis, said means permitting said support to provide said adjustment independent of said arm so as to calibrate the relative position of said element with respect to said arm.

9. An electrical switch comprising an actuating element, a mercury contactor switch mounted at one end of said actuating element, a support for the opposite end of said actuating element, and means for rotating said support to adjust the angular position of said switch, said means and said support having adjustment relative to each other.

10. An electrical switch comprising an actuating element, a mercury contactor switch at one end of said actuating element, a regulating arm adapted to adjust the angular position of said switch for operation at a predetermined temperature, a support for the opposite end of said actuating element, and an adjustable connection between said regulating arm and said support, said adjustable connection serving as calibrating means for adjusting the relative position of said switch with respect to said regulating arm.

In witness whereof, I have hereunto subscribed my name.

LOUIS A. M. PHELAN.